United States Patent
Ahmad et al.

(10) Patent No.: US 8,468,176 B2
(45) Date of Patent: *Jun. 18, 2013

(54) EXTENDED DATA STORAGE SYSTEM

(75) Inventors: Said Abdullah Ahmad, Tucson, AZ (US); Shawn Owen Brume, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,032

(22) Filed: May 22, 2012

(65) Prior Publication Data

US 2012/0233223 A1 Sep. 13, 2012

Related U.S. Application Data

(63) Continuation of application No. 12/550,305, filed on Aug. 28, 2009, now Pat. No. 8,229,972.

(51) Int. Cl.
*G06F 17/30* (2006.01)
(52) U.S. Cl.
USPC .......................................................... 707/802
(58) Field of Classification Search
USPC .......................................................... 707/802
See application file for complete search history.

(56) References Cited

U.S. PATENT DOCUMENTS

| | | | |
|---|---|---|---|
| 5,832,522 A | 11/1998 | Blickenstaff et al. | |
| 5,987,506 A * | 11/1999 | Carter et al. | 709/213 |
| 6,718,427 B1 | 4/2004 | Carlson et al. | |
| 7,016,908 B2 | 3/2006 | Kataoka et al. | |
| 7,085,900 B2 | 8/2006 | Inagaki et al. | |
| 7,136,862 B2 | 11/2006 | Mogi et al. | |
| 7,487,288 B2 * | 2/2009 | Kishi et al. | 711/112 |
| 7,584,201 B2 | 9/2009 | Casey | |
| 7,721,044 B1 | 5/2010 | Chatterjee et al. | |
| 7,743,206 B2 * | 6/2010 | Kishi et al. | 711/111 |
| 8,019,960 B2 * | 9/2011 | Gladwin et al. | 711/171 |
| 2004/0193760 A1 | 9/2004 | Matsunami et al. | |
| 2005/0256999 A1 * | 11/2005 | Kishi et al. | 711/111 |
| 2007/0103984 A1 * | 5/2007 | Kavuri et al. | 365/185.17 |
| 2008/0154907 A1 * | 6/2008 | Prasad et al. | 707/10 |
| 2008/0263277 A1 | 10/2008 | Matsunami et al. | |
| 2009/0119465 A1 * | 5/2009 | Kishi et al. | 711/154 |
| 2009/0292710 A1 | 11/2009 | Casey | |
| 2010/0002013 A1 * | 1/2010 | Kagaya | 345/619 |
| 2010/0023529 A1 * | 1/2010 | Gladwin et al. | 707/10 |
| 2010/0106654 A1 * | 4/2010 | Simpson et al. | 705/300 |

* cited by examiner

*Primary Examiner* — Sheree Brown
(74) *Attorney, Agent, or Firm* — John H. Holcombe

(57) ABSTRACT

In one embodiment, an extended data storage system employs a first data storage and an extended data storage. A first level of metadata is established with respect to data from the using entity, the first level of metadata is provided in the first data storage. The data from the using entity is stored in the extended data storage. A second level of metadata at least describing the data as stored in the extended data storage is also established, wherein the second level of metadata associated with the first level of metadata for the stored data. The first level of metadata is made accessible to the using entity at the first data storage; and the second level of metadata is made unavailable to the using entity. Thus, the data is stored in the extended data storage and a small amount of metadata is stored in the first data storage.

4 Claims, 4 Drawing Sheets

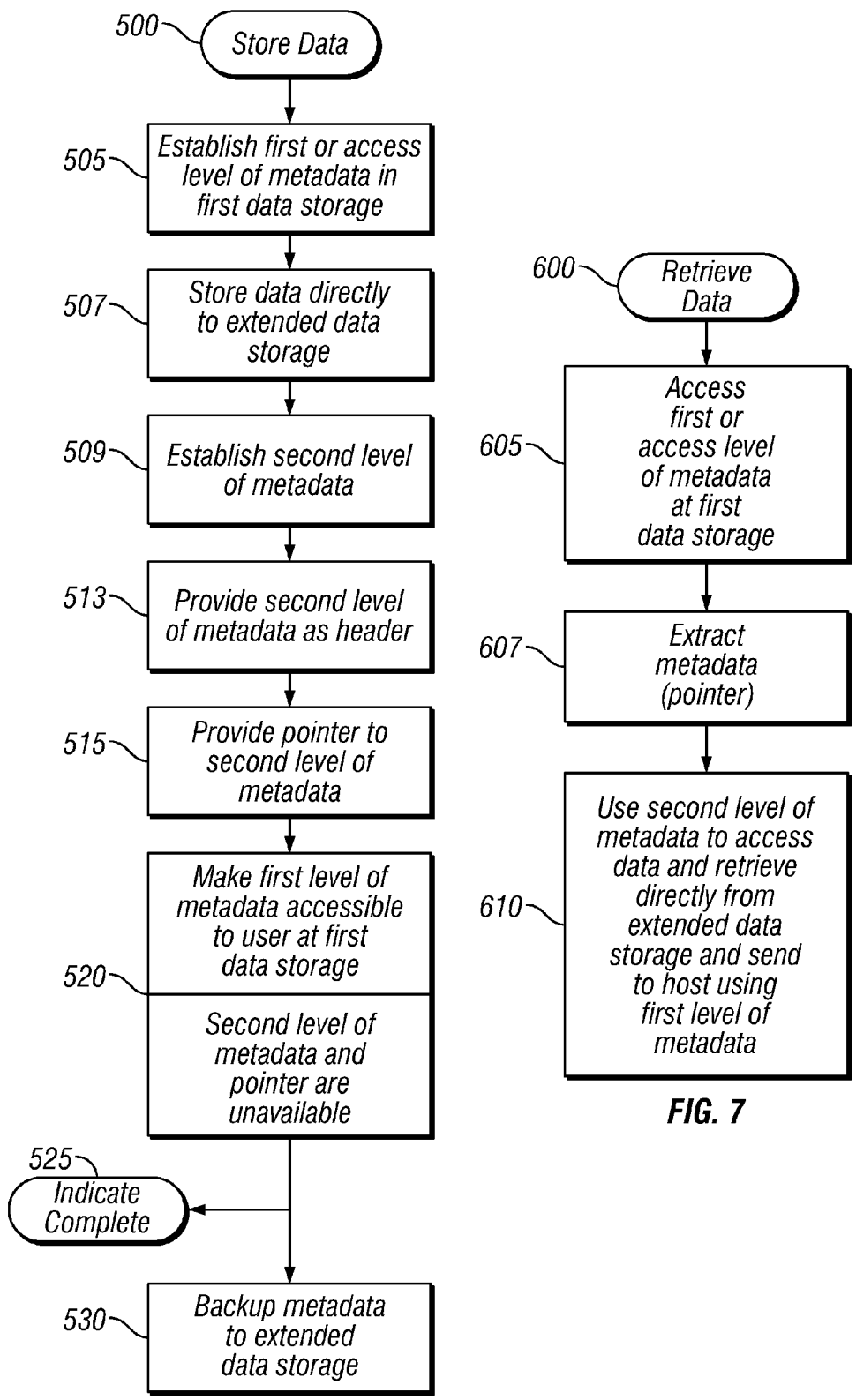

EXTENDED DATA STORAGE SYSTEM

CROSS-REFERENCE TO RELATED APPLICATION

The present Application is a continuation of U.S. patent application Ser. No. 12/550,305, Filed Aug. 28, 2009 now U.S. Pat. No. 8,229,972.

FIELD OF THE INVENTION

This invention relates to data storage, and more particularly to data storage systems having multiple data storage apparatus.

BACKGROUND OF THE INVENTION

Amounts of data to be stored continue to increase. Data storage apparatus can range from various forms of electronic memory to disk drives, such as RAID (redundant array of independent disks), JBOD (just a bunch of disks), to optical disk and magnetic tape drives and libraries. Data storage can be for a single host or for an entire network, for example, through Network Attached Storage (NAS).

Typically, data is stored on apparatus in a fashion related to the need to retrieve the data. For example, data comprising or used by an application of a host computer processor system is stored in apparatus offering higher speed access, such as electronic memory or disk drives. Data not likely to be accessed is typically stored to optical disk or magnetic tape. The optical disk or magnetic tape may also be subject to removal from the system and archived.

Generally speaking, higher speed data storage apparatus is more expensive per amount of data stored than is the lower speed data storage. Thus, in the typical data processing system, a smaller amount of higher speed data storage is provided, and the bulk of data is stored in the lower speed data storage. A typical procedure is to store data in higher speed data storage so long as it is used reasonably often, and then the data is destaged to lower speed data storage such as magnetic tape, for example, using a least recently used (LRU) algorithm. Data is typically retrieved by first going to the higher speed data storage or storage server, and, if the data is not there, then subsequently staging the data back from the lower speed data storage to the higher speed data storage for access.

SUMMARY OF THE INVENTION

Methods, data handling systems for data storage systems, data storage systems, and computer program products are provided for storing data.

In one embodiment, an extended data storage system comprises a first data storage and an extended data storage. A method for storing data from a using entity comprises the steps of:

establishing in the first data storage a first level of metadata with respect to data from the using entity, the first level of metadata identifying the data for access by the using entity;

storing the data from the using entity in the extended data storage;

establishing a second level of metadata at least describing the data as stored in the extended data storage, the second level of metadata associated with the first level of metadata for the stored data;

making the first level of metadata accessible to the using entity at the first data storage; and making the second level of metadata unavailable to the using entity.

Thus, the data is stored in the extended data storage and a small amount of metadata is stored in the first data storage.

In a further embodiment, the first level of metadata relates to the data in storage and presents information as required for the using entity; and the second level of metadata describes the data as physically stored in the extended data storage.

Another embodiment additionally comprises the step of storing the second level metadata in the first data storage and the extended data storage.

In a further embodiment, wherein the data is stored in the form of data files, the second level metadata is stored in the extended data storage at least in the form of a header with respect to the data.

In another embodiment, a copy of the first level metadata is stored in the extended data storage.

In still another embodiment, the first level of metadata is associated with a pointer to the second level of metadata for the data, and the method additionally comprises the step of making the pointer unavailable to the using entity.

In yet another embodiment, in a data handling system for a data storage system, wherein the data storage system comprises a first data storage and an extended data storage, the data handling system comprises at least one host interface to at least one using entity; at least one data storage interface to the first data storage and to the extended data storage; and a computer processing system configured to process data via the host interface(s) for storage via the data storage interface(s). The computer processing system is configured to perform the steps of:

establishing via the data storage interface(s) in the first data storage a first level of metadata with respect to data from a using entity, the first level of metadata identifying the data for access by the using entity;

storing the using entity data received via the host interface(s) in the extended data storage via the data storage interface(s);

establishing a second level of metadata at least describing the data as stored in the extended data storage, the second level of metadata associated with the first level of metadata for the stored data;

making the first level of metadata accessible to the using entity at the first data storage via the host interface(s); and making the second level of metadata unavailable to the using entity.

Still another embodiment comprises a data storage system comprising a first data storage configured to store data; an extended data storage configured to store data; and a data handling system configured to process and transfer data of at least one using entity with respect to the first data storage and the extended data storage. The data handling system configured to perform the steps of:

establishing in the first data storage a first level of metadata with respect to data from a using entity, the first level of metadata identifying the data for access by the using entity;

storing data received from the using entity in the extended data storage;

establishing a second level of metadata at least describing the data as stored in the extended data storage, the second level of metadata associated with the first level of metadata for the stored data;

making the first level of metadata accessible to the using entity at the first data storage; and making the second level of metadata unavailable to the using entity.

Another embodiment comprises a computer program product for storing data from a using entity in an extended data storage system comprising a first data storage and an extended data storage. The computer program product comprises a computer readable storage medium having computer readable program code, wherein the computer readable program code, when executed on a computer processing system, causes the computer processing system to:

establish in the first data storage a first level of metadata with respect to data from the using entity, the first level of metadata identifying the data for access by the using entity;

store the data from the using entity in the extended data storage;

establish a second level of metadata at least describing the data as stored in the extended data storage, the second level of metadata associated with the first level of metadata for the stored data;

make the first level of metadata accessible to the using entity at the first data storage; and make the second level of metadata unavailable to the using entity.

For a fuller understanding of the present invention, reference should be made to the following detailed description taken in conjunction with the accompanying drawings.

BRIEF DESCRIPTION OF THE DRAWINGS

FIG. 6 is a flow chart depicting an exemplary method of operating the data storage system of FIGS. 1 and 2 for storing data; and FIG. 7 is a flow chart depicting an exemplary method of operating the data storage system of FIGS. 1 and 2 to retrieve data.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
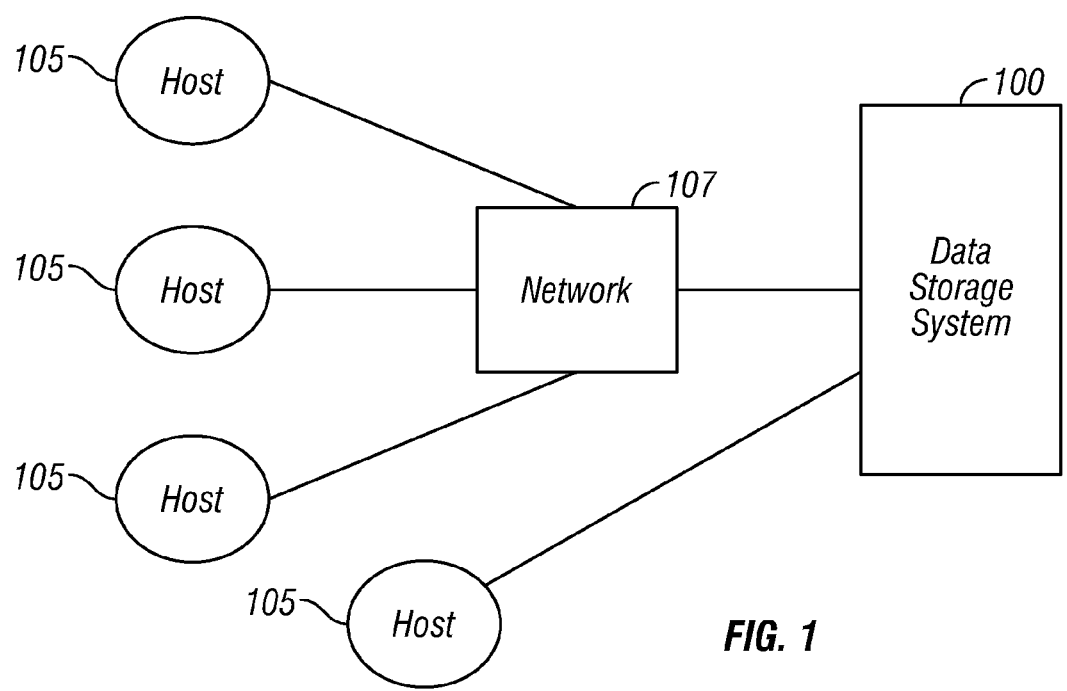
FIG. 1 is a diagrammatic illustration of hosts and of a data storage system which may implement the present invention.

Referring to FIG. 1, an example of a data storage system 100 is illustrated which stores data for hosts 105. The hosts 105 may be directly connected to the data storage system 100, or may be connected by means of a network 107, such as through Network Attached Storage (NAS).

Generally speaking, higher speed data storage apparatus is more expensive per amount of data stored than is the lower speed data storage. Thus, in the typical data processing system, a smaller amount of higher speed data storage is provided, and the bulk of data is stored in the lower speed data storage. A typical procedure is to store data in higher speed data storage so long as it is used reasonably often, and then the data is destaged to lower speed data storage such as magnetic tape, for example, using a least recently used (LRU) algorithm. Data is typically retrieved by first going to the higher speed data storage or storage server, and, if the data is not there, then subsequently staging the data back from the lower speed data storage to the higher speed data storage for access.

Figure 2:
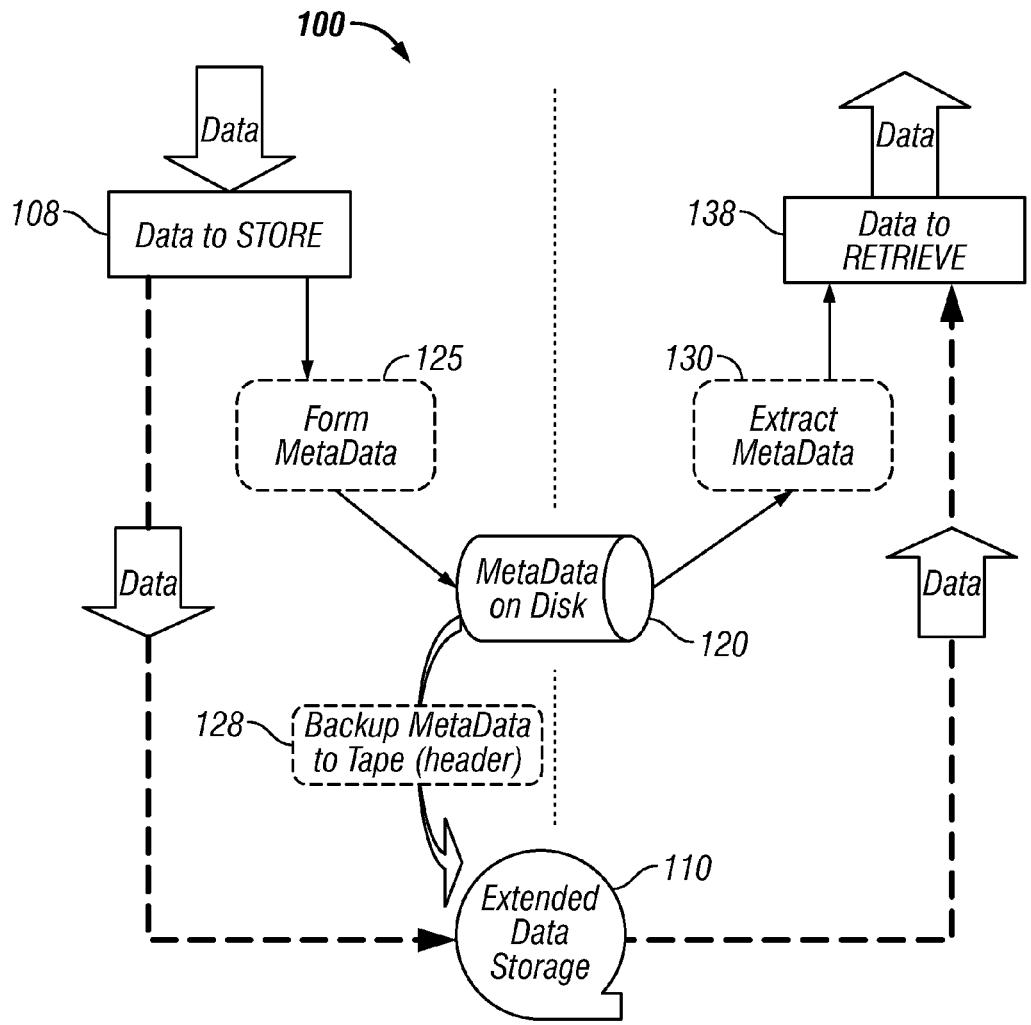
FIG. 2 is a data flow diagram illustrating exemplary data flow in the data storage system of FIG. 1.

Referring to FIGS. 1 and 2, the data storage system 100 instead directly stores the data 108 to an extended data storage 110, such as magnetic tape. The higher speed data storage 120, called first data storage herein, is employed to store metadata associated with the stored data.

The extended data storage 110 may comprise magnetic tape data storage, examples of which comprise magnetic tape drives and automated libraries. One example of a magnetic tape drive is the IBM 3580 Ultrium magnetic tape drive based on LTO technology. An example of an automated data storage library is the IBM 3584 UltraScalable Tape Library. The extended data storage may alternatively comprise other technologies, such as optical disk, optical disk libraries, etc.

The higher speed first data storage 120 may comprise disk drives, which may be a single drive, or may utilize RAID (Redundant Array of Independent Disks) protocols, or may comprise JBOD (Just a Bunch of Disks). An alternative example of high speed data storage 120 comprises flash memory arranged as SSD (Solid State Drives). The flash memory may also be arranged to provide redundancy such as a RAID arrangement. The speed difference between the first data storage and extended data storage is relative, as is the cost.

The data storage system 100 establishes a first or access level of metadata with respect to data 108 from a using entity or host 105, directly stores the data 108 in the extended data storage 110, and establishes a second level of metadata describing the data 108 as stored in the extended data storage 110, the second level of metadata associated with the first level of metadata for the stored data. The first and second levels of metadata are formed 125 to both relate to the data 108 being stored in extended data storage 110.

The first or access level of metadata is a database having entries that identify the data for access by the using entity, and presents information as required for the using entity, for example as a view of a file system of total data storage. The second level of metadata describes the data as physically stored in the extended data storage 110, for example as a physical file system. At least the first level of metadata is stored on the first data storage 120. The second level of metadata may also be stored in (but not necessarily together with) the first level of metadata in the first data storage, and/or stored in the extended data storage 110. As an example, the second level metadata is stored in the extended data storage 110 in the form of a header with respect to the data. As another example, the second level metadata is stored in the extended data storage in a metadata repository. A pointer may be provided with the first level of metadata, pointing to a location of the second level of metadata, either in the first data storage or the second level of storage, or both.

The first level of metadata at the first data storage is made accessible to the host or using entity 105, for example by having the file system entries viewable by the host or using entity. The second level of metadata is made unavailable to the using entity, as is the pointer, if any. The term "unavailable" means that the host does not have direct access to the metadata for accessing the data. Access may be granted for other purposes, such as data recovery.

Thus, the data 108 is stored in the extended data storage 110 and a small amount of metadata 125 is stored in the first data storage 120. The host or using entity 105 can only access the stored data employing the access information of the first level of metadata. The storage system has the appearance of vast capacity and the metadata access is available at a higher speed data storage 120 without having gone through the destaging and staging processes. The actual access latency is intermediate the immediacy of data stored in the higher speed data storage and the latency of data which has to be staged.

Additionally, a copy of the first level metadata 128 may be backed up and stored in the extended data storage. Another copy of the second level metadata may also be backed up and stored in the extended data storage 110. The copy of the metadata may be used for error recovery or to reconstitute metadata of the first data storage 120. In one example, the backup copy of the first level metadata is stored together with the second level metadata, in a header of the data, or a metadata repository, or both. A repository may be spread across the extended data storage 110, may comprise separate repositories for first and second level metadata, or may comprise one or more headers for all the data or for partitions of data. Herein, the term "header" encompasses any location of metadata in extended data storage 110.

To access the stored data from data storage system 100, a host or using entity 105 employs access information of the first level of metadata, and the first and second levels of metadata are extracted 130 by the data storage system 100, using the pointer if needed, and employed to retrieve the data 138 directly from the extended data storage 110.

Figure 3:
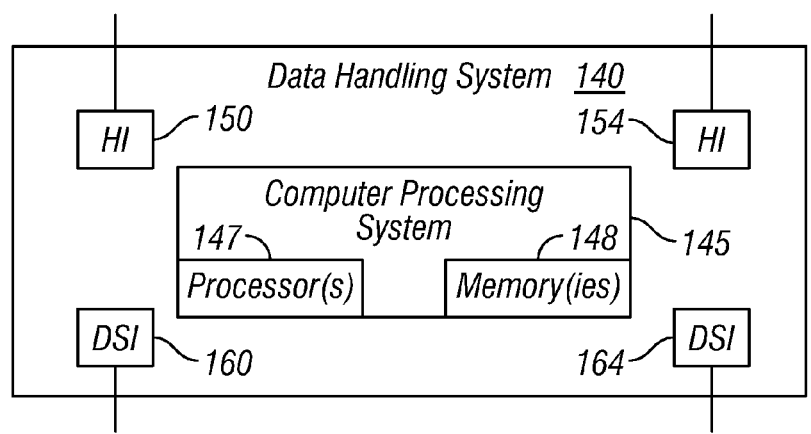
FIG. 3 is a block diagram of an exemplary data handling system for operating the data storage system of FIGS. 1 and 2.
Figure 4:
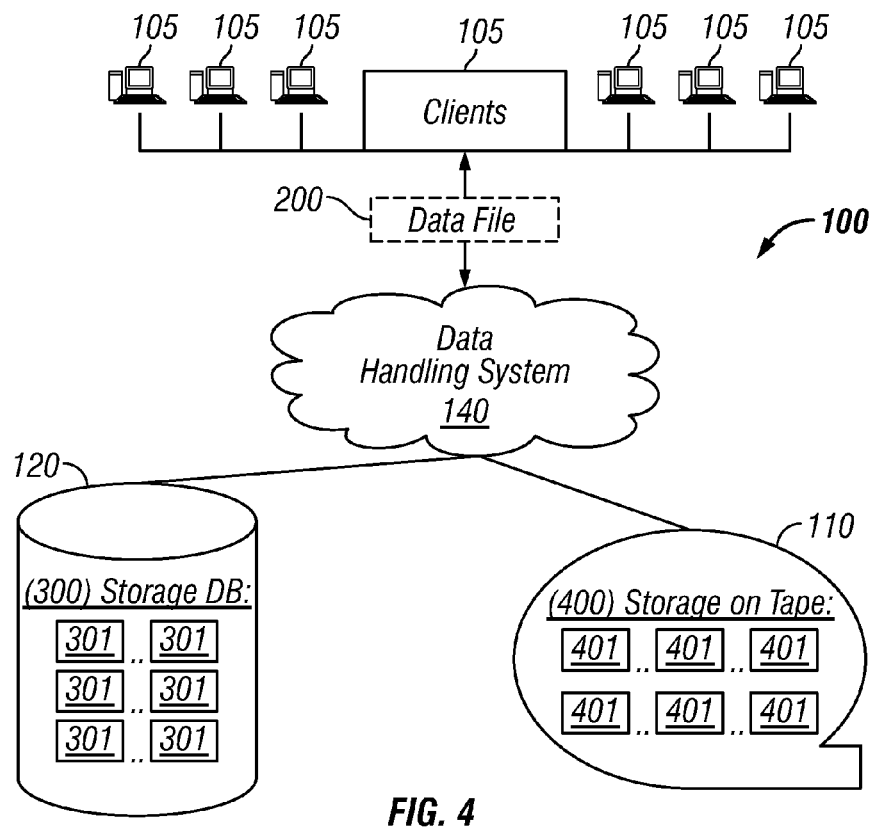
FIG. 4 is a diagrammatic illustration of an example of data as stored in the data storage system of FIGS. 1 and 2.
Figure 5A:
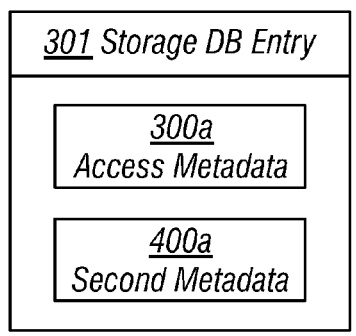
FIGS. 5A and 5B are diagrammatic illustrations of data entries of the data of FIG. 4.
Figure 5B:
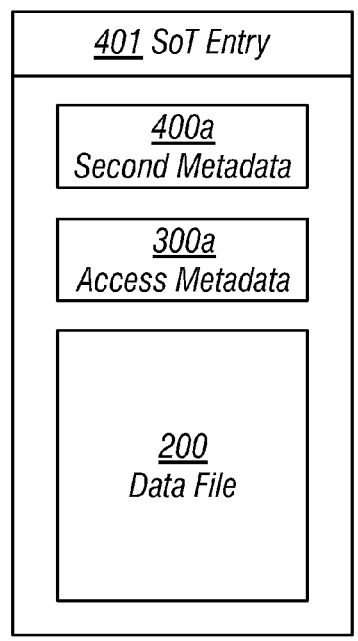

Referring to FIG. 3, the data storage system 100 of FIGS. 1 and 2 comprises a data handling system 140 to control the handling and formation of the data and metadata. The data handling system comprises a computer processor system 145 configured to operate the data storage system, the computer processor system having computer processor(s) 147 configured to operate the data storage system, and memory(ies) 148 configured to store information and computer readable program information for operating the computer processor(s). Herein "computer processor", "computer processing system" or "control" may comprise any suitable logic, programmable logic, microprocessor, and associated or internal memory for responding to program instructions, and the associated or internal memory may comprise fixed or rewritable memory or data storage devices. The program information may be supplied to the subsystem control or memory from a host or via a data storage drive or disk array, or by an input from a floppy or optical disk, or by being read from a cartridge, or by a web user interface or other network connection, or by any other suitable means. The program information thus may comprise one or more program products comprising a computer useable storage medium having computer usable program code stored therein for operating the data storage system 100, or similar types of systems or devices.

Host interfaces 150, 154 may comprise one or more host adapters, Fibre Channel ports, one or more FICON ports, one or more ESCON ports, one or more SCSI ports, or other suitable ports. Each host interface is configured to communicate with a host system 105 or network 107 of FIG. 1 such that the data handling system can handle I/O from any host or using entity. In one example, the interfaces 150, 154 connect to an Ethernet based network 107 via standard TCP/IP protocols and allowed the user to effectively send data directly to magnetic tape in a virtual environment.

Data storage interfaces 160, 164 may comprise communication links for communication with first data storage 120 and extended data storage 110. The communication links may comprise device adapter, for example for serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

An example of a data handling subsystem 140 comprises an IBM® Enterprise Storage Server, IBM® Model DS 8000, or other comparable system.

The data may be arranged in various units of data of constant or variable sizes. In one example, data is arranged in units of data called "files". In other examples, data is arranged in units of data called "data sets", or "extents" or "sectors". Another example is related to addressing and is called "LUN"s for Logical Units. Other examples are known to those of skill in the art. Hence, herein, the generic terms used are "data" or "data file".

In one embodiment, referring to FIGS. 3, 4, 5A, 5B and 6, at step 500, a host 105 provides a command to store a data file 200 in the data storage system 100, which command is received at a host interface 150, 154 of data handling system 140. The data handling system 140 responds to the command by performing several functions, which are illustrated in sequential form in FIG. 6. As is known to those of skill in the art, the functions may be performed in any suitable order, effectively, all in one grouping of events.

At step 505, the data handling system 140 establishes a first or access level of metadata with respect to data file 200, which comprises at least part of an entry 301 in a database 300, and stores the entry 301, via a data storage interface 160, 164, to first data storage 120. At step 507, the data handling system 140 directly stores the data file 200, via host interface 150, 154, and data storage interface 160, 164, to the extended data storage 110. At step 509, the data handling system 140 establishes a second level of metadata describing the data file 200 as stored in the extended data storage 110, the second level of metadata associated with the first or access level of metadata for the stored data. The second level metadata comprises a part of entry 401. The second level metadata is stored, via data storage interface 160, 164, in the extended data storage 110, for example as an entry 400a in a database 400. Alternatively or additionally, in one embodiment in accordance with step 513, the entry 401 may comprise a header 400a to the data file, including the second level metadata, and the stored data file 200. The first and second levels of metadata are formed together to both relate to the data file 200 being stored in extended data storage 110. Database 400 may be commensurate with extended data storage 110, or alternatively the extend data storage may be capable of storing additional data beyond that of the database. The database 400 and extended data storage, as discussed above, may comprise magnetic tape data storage, shown as "storage on tape" or "SoT", or may comprise alternative technologies.

A first level metadata entry 300a in an entry 301 of a database 300, identifies the data file 200 for access by the using entity, and presents information as required for the using entity, for example as a view of a file system of total data storage. Entry 300a comprises data related to the file in storage, but from the viewpoint of the user or user's client, such as Filename, Filesize, modification date, owner, access permissions, etc., as is known to those of skill in the art.

The second level of metadata entry 400a describes the data file 200 as physically stored in the extended data storage 110, for example by a physical file system. Entry 400a relates to the actual storage of the data file, and may comprise the volume, volume block location, etc., as is known to those of skill in the art.

At least the first or access level of metadata 300a is stored on the first data storage 120. The second level of metadata 400*a* may also be stored in (but not necessarily together with) the first or access level of metadata 300*a* in the first data storage as a part of entry 301. As an example, if the second level metadata is stored separately from the first or access level of metadata, either in first data storage 120, or in the extended data storage 110, in step 515, a pointer may be provided with the first or access level of metadata entry 300*a*, pointing to a location of the second level of metadata 400*a*, either in the first data storage or the second level of storage, or both.

In step 520, the first or access level of metadata 300*a* is made accessible to the host or using entity 105, for example by having the file system entries 300*a* of the database 300 viewable by the host or using entity. The second level of metadata 400*a* is made unavailable to the using entity, as is the pointer, if any, even if the second level of metadata 400*a* and/or the pointer are parts of the same entries 301 of the database 300.

Thus, the data 108 is stored in the extended data storage 110 and a small amount of metadata 300 is stored in the first data storage 120. The data storage is indicated as completed by a return indication to the host or using entity 105 in step 525.

Additionally, in step 530, a copy of the first level metadata 300*a* may be backed up and stored in the extended data storage 110, for example to a separate data file in the extended data storage, or as added to the entry 401. Another copy of the second level metadata may also be backed up and stored in the extended data storage 110. The copy of the metadata may be used for error recovery or to restore and rebuild metadata of the first data storage 120.

In one embodiment, no data outside of the metadata 300 is stored on the first data storage 120. All data stored on the data storage system 100 is stored in the extended data storage 110.

Referring to FIGS. 3, 4, 5A, 5B and 7, in one embodiment, at step 600, a host 105 provides a command to retrieve a data file from the data storage system 100. To access the stored data, a host or using entity 105 employs access information of the first level of metadata 300*a*. The command having access information is received at a host interface 150, 154 of data handling system 140. The data handling system 140 responds to the command by performing several functions, in one embodiment, beginning at step 605, accessing the first level of metadata 300*a* for the metadata entry 301 relating to the desired data. In one embodiment, in step 607, the data handling system uses the pointer to access and extract the associated second level of metadata 400*a*, for example of entry 401 of the extended data storage 110. Alternatively, the associated second level of metadata 400*a* is also located in the entry 301 for the desired data in the first data storage 120, and the first and second levels of metadata are extracted by the data handling system 140.

In step 610, in one embodiment, the extracted second level of metadata 400*a* is used to retrieve the data file 200 from the extended data storage 110, and the first or access level of metadata is used to send the data file directly to the host or using entity 105, via the data storage interface 160, 164, and the host interface 150, 154.

The implementations may involve software, firmware, micro-code, hardware and/or any combination thereof. The implementation may take the form of code or logic implemented in a medium, such as memory 148 of FIG. 3, storage 120 of FIG. 2, and/or circuitry 147 of FIG. 3 where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for storing data from a host in an extended data storage system comprising a first data storage of high speed and an extended data storage of lower speed, comprising the steps of:

establishing in said first high speed data storage a first level of metadata with respect to data from said host, said first level of metadata identifying said data for access by said host;

storing said data from said host in said extended data storage and storing a copy of said first level of metadata in said extended data storage;

establishing a second level of metadata at least describing said data as stored in said extended lower speed data storage and stored in the form of a header, said second level of metadata associated with said first level of metadata for said stored data via a pointer;

making said first level of metadata accessible to said host at said first high speed data storage;

making direct access to said second level of metadata unavailable to said host;

said storage system using said pointer to access and extract said second level of metadata; and said storage system using said extracted second level of metadata to retrieve said data from said extended data storage and using said first level of metadata to send said data to said host.

2. A data handling system for a data storage system, said data storage system comprising a first data storage of high speed and an extended data storage of lower speed, said data handling system comprising:

at least one host interface to at least one host;

at least one data storage interface to said first high speed data storage and to said extended lower speed data storage; and a computer processing system configured to process data via said at least one host interface for storage via said at least one data storage interface, said computer processing system configured to perform the steps of:

establishing via said at least one data storage interface in said first high speed data storage a first level of metadata with respect to data from a host, said first level of metadata identifying said data for access by said host;

storing said host data received via said at least one host interface in said extended lower speed data storage via said at least one data storage interface and storing a copy of said first level of metadata in said extended data storage;

establishing a second level of metadata at least describing said data as stored in said extended lower speed data storage and stored in the form of a header, said second level of metadata associated with said first level of metadata for said stored data via a pointer;

making said first level of metadata accessible to said host via said at least one host interface at said first data storage;

making direct access to said second level of metadata unavailable to said host;

using said pointer to access and extract said second level of metadata; and using said extracted second level of metadata to retrieve said data from said extended data storage and using said first level of metadata to send said data to said host.

3. A data storage system comprising:

a first high speed data storage configured to store data;

an extended lower speed data storage configured to store data; and a data handling system comprising at least one computer processor system configured to process and transfer data of at least one host with respect to said first high speed data storage and said extended lower speed data storage, said data handling system configured to perform the steps of:

establishing in said first high speed data storage a first level of metadata with respect to data from a host, said first level of metadata identifying said data for access by said host;

storing data received from said host in said extended lower speed data storage and storing a copy of said first level of metadata in said extended data storage;

establishing a second level of metadata at least describing said data as stored in said extended lower speed data storage and stored in the form of a header, said second level of metadata associated with said first level of metadata for said stored data via a pointer;

making said first level of metadata accessible to said host at said first data storage;

making direct access to said second level of metadata unavailable to said host;

using said pointer to access and extract said second level of metadata; and using said extracted second level of metadata to retrieve said data from said extended data storage and using said first level of metadata to send said data to said host.

4. A computer program product for storing data from a host in an extended data storage system comprising a first high speed data storage and an extended lower speed data storage, said computer program product comprising a computer readable storage medium having computer readable program code, wherein said computer readable program code, when executed on a computer processing system, causes said computer processing system to:

establish in said first high speed data storage a first level of metadata with respect to data from said host, said first level of metadata identifying said data for access by said host;

store said data from said host in said extended lower speed data storage and store a copy of said first level of metadata in said extended data storage;

establish a second level of metadata at least describing said data as stored in said extended lower speed data storage and stored in the form of a header, said second level of metadata associated with said first level of metadata for said stored data via a pointer;

make said first level of metadata accessible to said host at said first high speed data storage;

make direct access to said second level of metadata unavailable to said host;

use said pointer to access and extract said second level of metadata; and use said extracted second level of metadata to retrieve said data from said extended data storage and using said first level of metadata to send said data to said host.

* * * * *